United States Patent
Kong et al.

(10) Patent No.: US 8,780,793 B2
(45) Date of Patent: Jul. 15, 2014

(54) APPARATUS AND METHOD FOR PROVIDING SHORT MESSAGE SERVICE AND MULTIMEDIA MESSAGING SERVICE OVER A WIRED TELEPHONE NETWORK

(75) Inventors: Dong-Keon Kong, Suwon-si (KR); Sang-Do Lee, Seoul (KR); Sung-Won Lee, Seongnam-si (KR); Dae-Seok Kim, Seoul (KR); Sang-Jun Moon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1571 days.

(21) Appl. No.: 11/605,483

(22) Filed: Nov. 29, 2006

(65) Prior Publication Data

US 2007/0123281 A1 May 31, 2007

(30) Foreign Application Priority Data

Nov. 29, 2005 (KR) .................. 10-2005-0114532

(51) Int. Cl.
*H04W 4/00* (2009.01)
*H04B 1/38* (2006.01)

(52) U.S. Cl.
USPC ..................................... 370/328; 455/561

(58) Field of Classification Search
USPC ............. 455/466, 412.1, 412.2, 414.1, 414.4, 455/422.1, 426.1, 426.2, 432.1–444, 456.5, 455/560, 561, 95, 41.4, 151.2; 370/310.2, 370/328, 338, 351–356, 349, 466, 467, 471, 370/496, 522
See application file for complete search history.

(56) References Cited

U.S. PATENT DOCUMENTS

| 5,555,017 | A  | * | 9/1996  | Landante et al. .......... 348/14.09 |
| 6,571,103 | B1 | * | 5/2003  | Novakov ....................... 455/464 |
| 6,930,987 | B1 | * | 8/2005  | Fukuda et al. ................ 370/328 |
| 2003/0147514 | A1 | * | 8/2003  | Ryu et al. ................... 379/93.23 |
| 2004/0141484 | A1 | * | 7/2004  | Rogalski et al. .............. 370/338 |
| 2004/0242230 | A1 | * | 12/2004 | Rue ............................... 455/433 |
| 2006/0006230 | A1 | * | 1/2006  | Bear et al. .................... 235/435 |
| 2006/0046752 | A1 | * | 3/2006  | Kalavade ..................... 455/466 |
| 2008/0259886 | A1 | * | 10/2008 | Svarre et al. ................. 370/338 |

FOREIGN PATENT DOCUMENTS

KR     10-2004-0062226 A     7/2004

* cited by examiner

*Primary Examiner* — San Htun
(74) *Attorney, Agent, or Firm* — Roylance, Abrams, Berdo and Goodman, LLP (57) ABSTRACT

An apparatus and method for providing Short Message Service (SMS) and Multimedia Messaging Service (MMS) over a wired telephone network are provided. In an Access Point (AP), an access module provides a wireless connection interface for wireless communication with a convergence terminal. A control module controls wireless communication and communications with the wired telephone network to provide the SMS and the MMS to the convergence terminal via the access module. A wired phone module, connected to the access module and the wired telephone network, exchanges wireless communication signals with the wired telephone network. An SMS processor, connected to the access module and the wired telephone network, processes SMS transmission and reception, and an MMS processor, connected to the access module, processes MMS transmission and reception.

19 Claims, 11 Drawing Sheets

APPARATUS AND METHOD FOR PROVIDING SHORT MESSAGE SERVICE AND MULTIMEDIA MESSAGING SERVICE OVER A WIRED TELEPHONE NETWORK

CROSS-REFERENCE TO RELATED APPLICATION

This application claims the benefit under 35 U.S.C. §119 of Korean Patent Application No. 10-2005-0114532, filed Nov. 29, 2005 in the Korean Intellectual Property Office, the entire disclosure of which is incorporated herein by reference.

BACKGROUND OF THE INVENTION

1. Field of the Invention

The present invention relates to an apparatus and method for providing Short Message Service (SMS)/Multimedia Messaging Service (MSS). More specifically, the present invention relates to an apparatus and method for providing Short Message Service (SMS)/Multimedia Messaging Service (MSS) to a convergence terminal supporting mobile communication technology and a wireless communication technology other than the mobile communication technology, when the convergence terminal is connected to a wired telephone network such as a Public Switched Telephone Network (PSTN) or an Integrated Service Digital Network (ISDN) by the wireless communication technology.

2. Description of the Related Art

Figure 1:
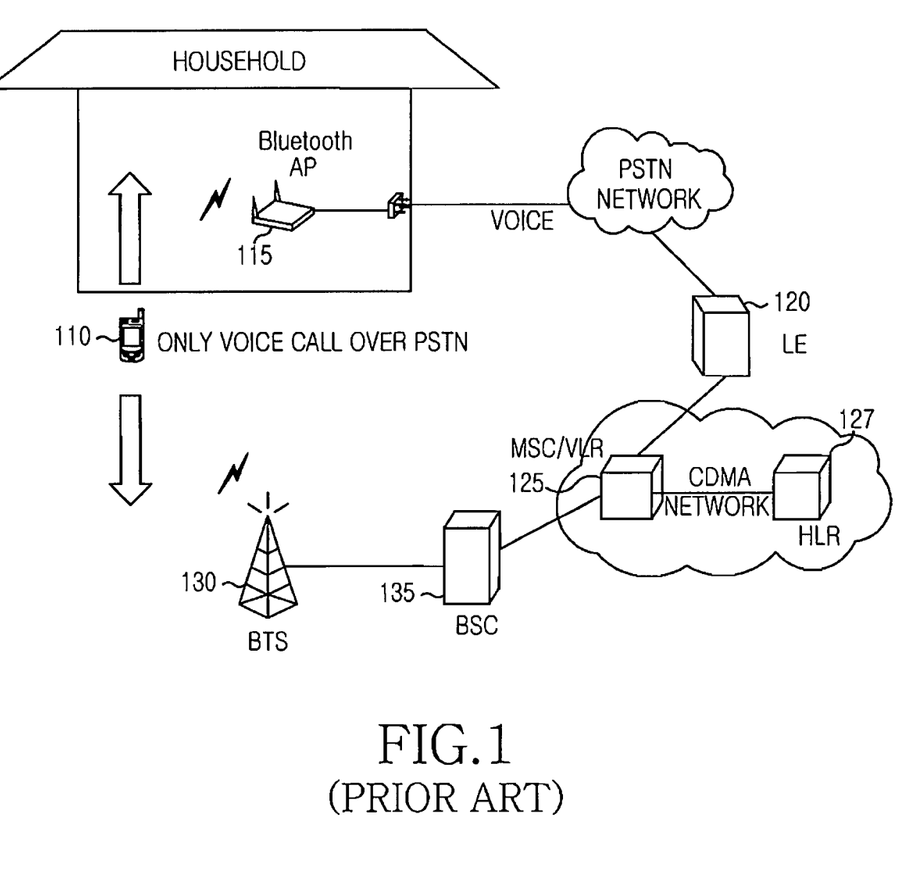
FIG. 1 illustrates the configuration of a conventional wired telephone network for providing SMS and MMS.

FIG. 1 illustrates the configuration of a conventional wired telephone network for providing SMS and MMS.

Referring to FIG. 1, a convergence terminal 110 is enabled with the Bluetooth technology so that it acts as a wired phone when indoors. Also, it acts as a mobile communication terminal when outdoors. Thus, the convergence terminal 110 provides wired-wireless convergence services.

The convergence terminal 110 basically supports a cellular technology (for example, Code Division Multiple Access (CDMA)) and supports a wireless communication technology other than the cellular technology as well. Indoors, it is able to originate and terminate calls over a wired telephone network by the wireless communication technology like a wired phone.

A Bluetooth Access Point (AP) 115 processes a Bluetooth wireless communication protocol with the convergence terminal 110 and interfaces between the convergence terminal 110 and the wired telephone network for voice service.

A Local Exchange (LE) 120 is a local exchange. A Mobile Switching Center (MSC) 125 functions like an exchange of the PSTN. The MSC 125 is responsible for mobility management, location registration and management, authentication, handover, and roaming for mobile subscribers.

A Home Location Register (HLR) 127 is a database center for managing information about the states, statistics, and services of the mobile subscribers as well as the current location information of the convergence terminal 110. The HLR 127 also provides a variety of additional services including SMS, authentication service, Voice Mail Service (VMS), and so forth, and interworks with other exchanges.

A Visitor Location Register (VLR) stores part of the information about call control and service provisioning of the HLR 127. It typically resides in the MSC 125.

A Base Transceiver Station (BTS) 130 is a wireless Base Station (BS) device. It is wirelessly connected to the convergence terminal 110 and to a Base Station Controller (BSC) 135 by a cable.

The BSC 135 is located between the BTS 130 and the MSC 125 for managing and controlling the BTS 130.

The convergence terminal 110 has to conduct mobile communications over a mobile communication network, even when a mobile communication signal is weak, for SMS and MMS provisioning. Therefore, even though the convergence terminal 110 can send and receive high-quality Bluetooth signals over the wired telephone network when indoors, it has to use the mobile communication technology to receive SMS and MMS.

Accordingly, a need exists for an apparatus and method for enabling the convergence terminal to use the wired telephone network under the above-described circumstances.

SUMMARY OF THE INVENTION

An object of embodiments of the present invention is to substantially solve at least the above problems and/or disadvantages, and to provide at least the advantages described below. Accordingly, an object of embodiments of the present invention is to provide an apparatus and method for providing SMS and MMS to a convergence terminal over a wired telephone network in an environment where the convergence terminal can use a wireless communication technology like Bluetooth other than a mobile communication technology.

The above and other objects are achieved by providing an apparatus and method for providing SMS and MMS over a wired telephone network.

According to one aspect of embodiments of the present invention, in an AP for providing SMS and MMS in a wired telephone network, an access module provides a wireless connection interface for wireless communication with a convergence terminal. A control module controls wireless communication and communications with the wired telephone network in order to provide the SMS and the MMS to the convergence terminal via the access module. A wired phone module is connected to the access module and the wired telephone network, and exchanges signals of a wireless communication network with the wired telephone network under the control of the control module. An SMS processor is connected to the access module and the wired telephone network, and processes transmission and reception of a short message under the control of the control module. An MMS processor is connected to the access module, and processes transmission and reception of a multimedia message under the control of the control module.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

A number of exemplary embodiments of the present invention will be described herein below with reference to the accompanying drawings. In the following description, well-known functions or constructions are not described in detail where they would obscure the invention in unnecessary detail.

Embodiments of the present invention are intended to provide an apparatus and method for providing SMS and MMS to a convergence terminal over a wired telephone network under the circumstance where a wireless communication technology such as Bluetooth, other than a mobile communication technology, is available to the convergence terminal.

The convergence terminal refers to a mobile communication terminal with two or more wireless interfaces. It can be assumed herein for example, that in exemplary embodiments of the present invention, the convergence terminal is a mobile communication terminal using the mobile communication technology and the wireless communication technology such as Bluetooth, Wireless Local Area Network (WLAN), or Worldwide Interoperability for Microwave Access (WiMAX).

Figure 2:
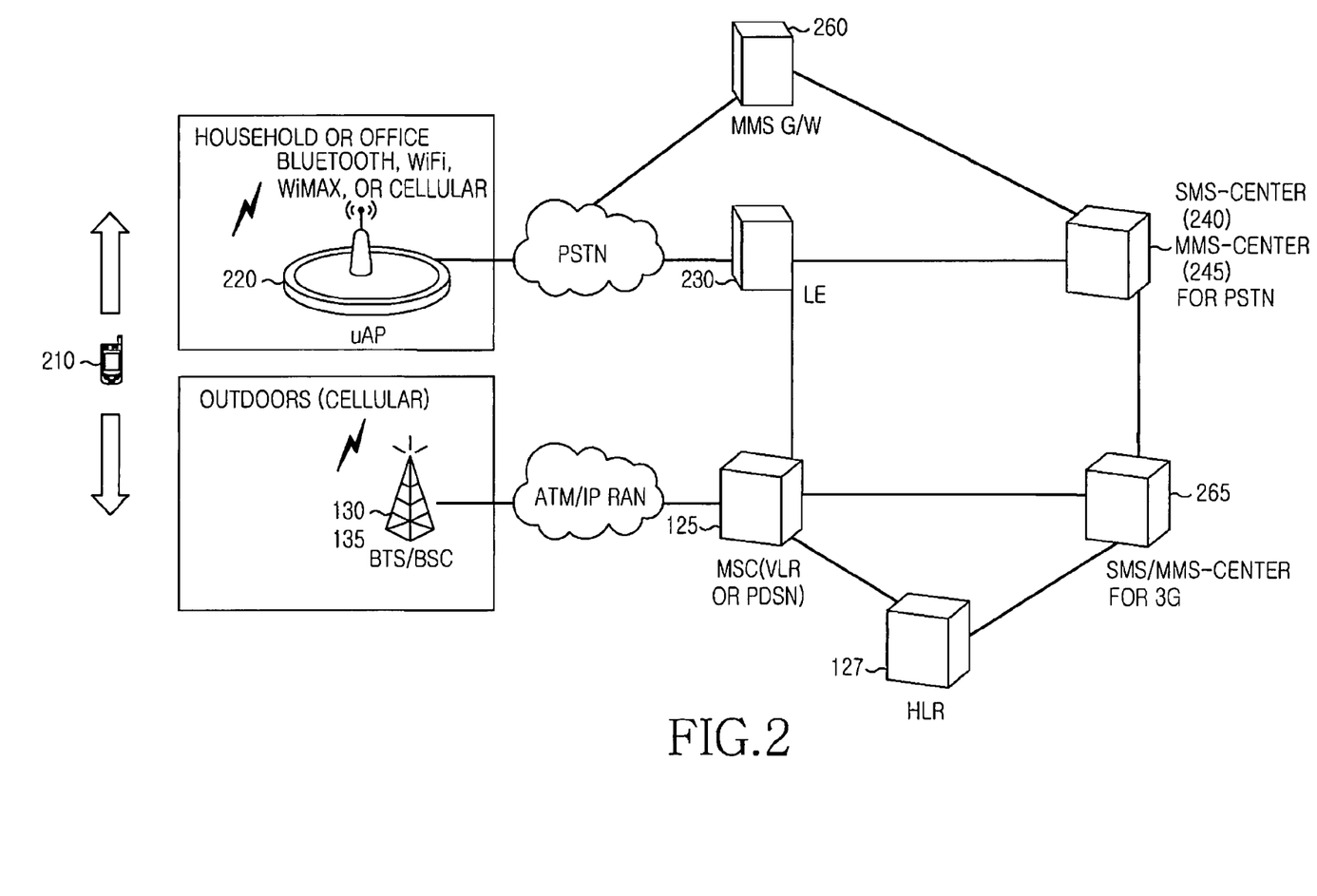
FIG. 2 illustrates a network configuration according to exemplary embodiments of the present invention.

FIG. 2 illustrates a network configuration according to exemplary embodiments of the present invention.

Referring to FIG. 2, a uAP 220 provides SMS and MMS to a convergence terminal 210 over a wired telephone network (herein, PSTN) instead of a mobile communication network. The uAP 220 can communicate with the convergence terminal 210 by Wireless Fidelity (WiFi), Bluetooth, WiMAX, and the like.

The convergence terminal 210 supports the mobile communication technology and a wireless communication technology other than the mobile communication technology, like WiFi, Bluetooth, WiMAX, and the like.

An MMS GateWay (G/W) 260 connects an MMS-Center (MMSC) 245 to the convergence terminal 210 over the wired telephone network by a Point-to-Point Protocol (PPP) for example.

An SMS-Center (SMSC) 240 provides SMS to the convergence terminal 210 over the wired telephone network. The MMSC 245 provides MMS to the convergence terminal 210 also over the wired telephone network. The SMSC 240 and the MMSC 245 can be incorporated into a single device or implemented separately. A Local Exchange (LE) 230 can also connect the convergence terminal 210 to one or more of the SMS-Center (SMSC) 240, the MMS-Center (MMSC) 245, and the MSC 125.

An SMS/MMS-center 265 provides SMS and MMS to the convergence terminal 210 over the mobile communication network.

Figure 3:
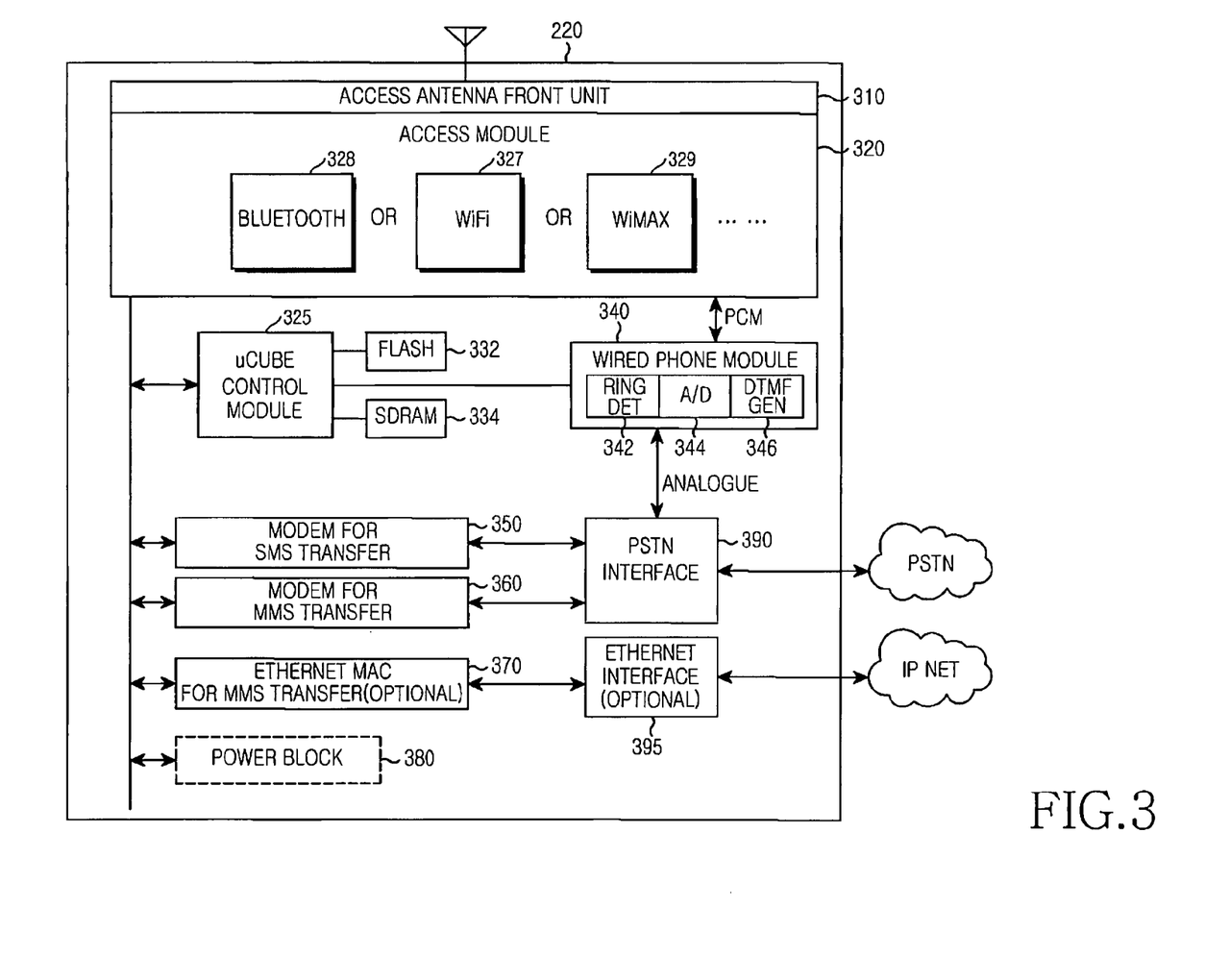
FIG. 3 is a block diagram illustrating the configuration of a ubiquitous AP (uAP) according to exemplary embodiments of the present invention.

FIG. 3 is a block diagram illustrating the configuration of the uAP 220 according to exemplary embodiments of the present invention.

Referring to FIG. 3, an access module 320 comprises an access antenna front unit 310. The access module 320 provides a wireless connection technology that connects the uAP 220 to the convergence terminal 210. The wireless communication technology can be Bluetooth 328, WiFi 327, WiMAX 329, and the like.

A uCube control module 325 carries out communication control functionality by controlling an SMS MODEM 350, an MMS MODEM 360, and a wired phone module 340.

A Synchronous Dynamic Random Access Memory (SDRAM) 334 is provided as a working memory for the uCube control module 325. The SDRAM 334 stores temporary data generated during execution of programs. A flash memory 332 is provided to store updateable data to be kept.

The wired phone module 340 comprises a ring detector 342, an Analog-to-Digital (A/D) converter 344, and a Dual Tone Multiple Frequency (DTMF) generator 346.

The ring detector 342 detects an incoming ring signal. The A/D converter 344 performs analog-to-digital conversion to conduct digital communication (i.e. Pulse Code Modulation (PCM) information transmission) with the access module 320 and analog communication with a PSTN interface 390. The DTMF generator 346 generates DTMF tones to deliver signals from the keypad of a standard wired phone.

The SMS MODEM 350 performs modulation and demodulation in order to send Frequency Shift Keying (FSK) data at a rate of, for example, 1200 bauds. The SMS MODEM 350 also modulates a Short Message (SM) received from the convergence terminal 210 in FSK and sends the modulated SM to the SMSC 240. It still further demodulates an SM received from the SMSC 240.

The MMS MODEM 360 establishes a dial-in connection with the MMS G/W 260. The PSTN interface 390 interfaces with the PSTN, for data transmission/reception to/from the PSTN.

An Ethernet interface 395 can be provided as an interface for sending a Multimedia Message (MM) over an Internet Protocol (IP) network.

An Ethernet Media Access Control (MAC) for MMS transfer 370 can be provided to demodulate data received through the Ethernet interface 395 and provide the demodulated data to the uCube control module 325. It can also modulate data received from the uCube control module 325 and output the modulated data to the Ethernet interface 395.

A power block 380 can also be provided to supply power to each module of the uAP.

Figure 4:
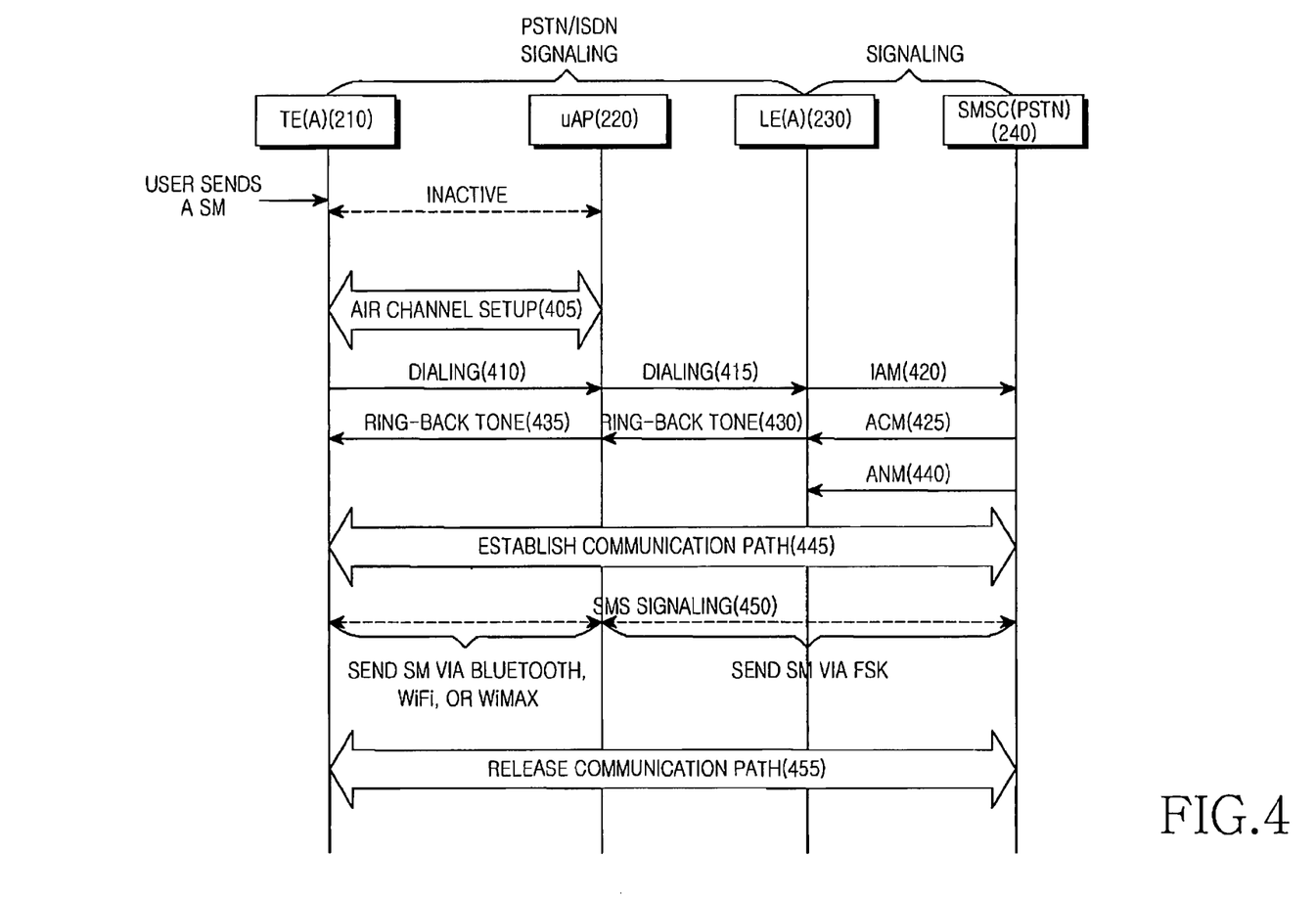
FIG. 4 is a diagram illustrating a signal flow for SMS transmission according to exemplary embodiments of the present invention.

FIG. 4 is a diagram illustrating a signal flow for SMS transmission according to exemplary embodiments of the present invention.

Referring to FIG. 4, upon request of transmission of an SM from a user, the convergence terminal 210 is connected to the uAP 220 by establishing a physical channel in step 405.

Then, the convergence terminal 210 attempts to call the SMSC 240. Specifically, the convergence terminal 210 sends a dialing signal to the uAP 220 in step 410, and the uAP 220 forwards the dialing signal to the LE 230 in step 415.

The LE 230 sends an Initial Address Message (IAM) of Signaling System 7 (SS7) to the SMSC 240 in step 420. The IAM is sent for initialization to initiate a call.

Upon receipt of the IAM, the SMSC 240 replies to the LE 230 with an Address Completion Message (ACM) in step 425. The ACM indicates that the IAM has arrived at the right destination, i.e. the IAM has successfully been received.

The LE 230 sends a ring-back tone signal to the uAP 220 in step 430 and the uAP 220 forwards the ring-back tone signal to the convergence terminal 210 in step 435.

In step 440, the SMSC 240 sends an ANswer Message (ANM) to the LE 230, notifying that the call attempted by the convergence terminal 210 has been connected to the SMSC 240.

Thus, a communication path is established between the convergence terminal 210 and the SMSC 240 in step 445.

In step 450, the convergence terminal 210 and the SMSC 240 exchange SMS signals in compliance with the European Telecommunications Standards Institute (ETSI) European Standard (ES) 201 912. The SMS signaling involves transmission of the SM from the convergence terminal 210 to the SMSC 240.

In step 455, the convergence terminal 210 and the SMSC 240 release the communication path.

Figure 5:
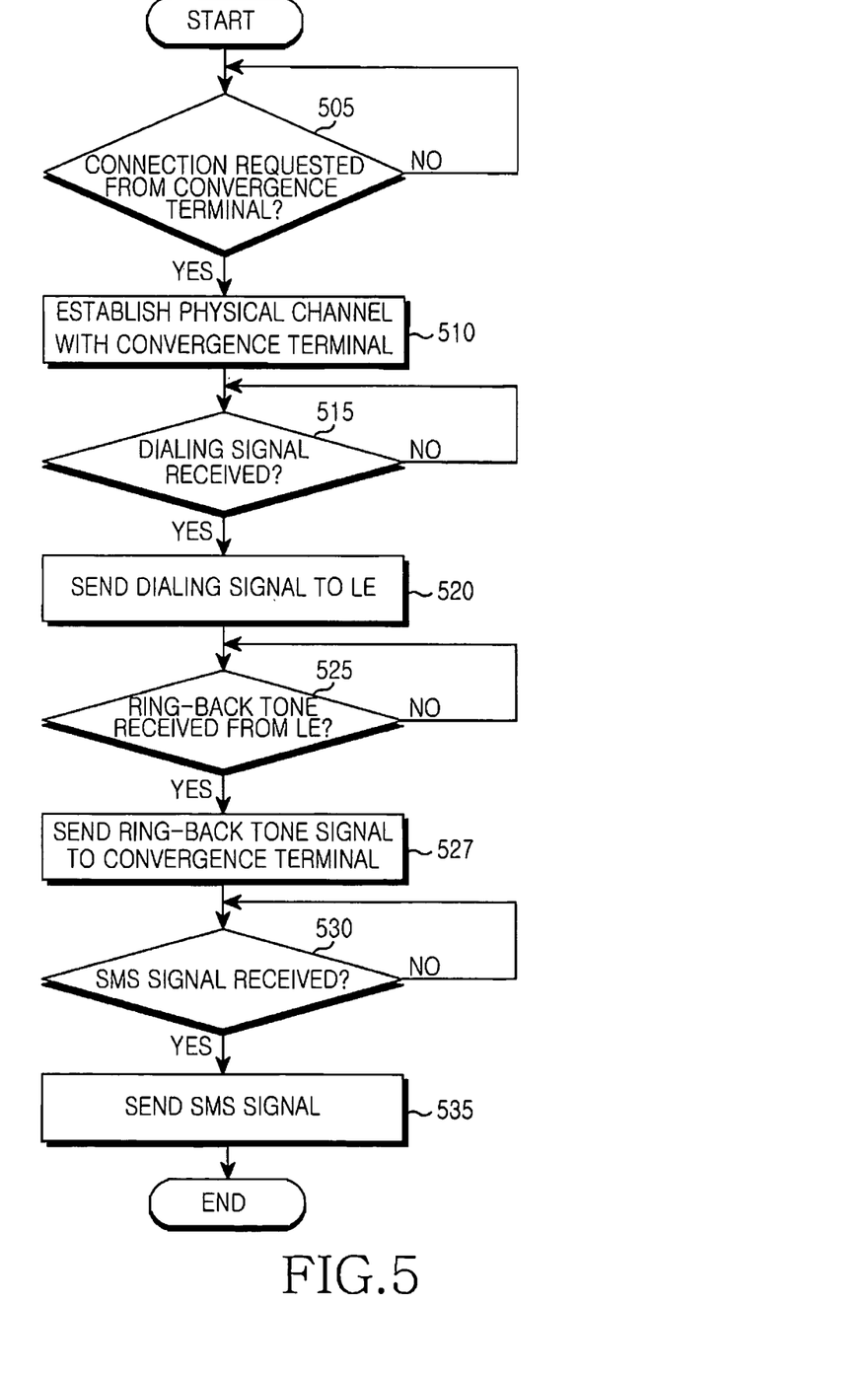
FIG. 5 is a flowchart illustrating an operation of the uAP for SMS transmission according to exemplary embodiments of the present invention.

FIG. 5 is a flowchart illustrating an operation of the uAP for SMS transmission according to exemplary embodiments of the present invention.

Referring to FIG. 5, upon receipt of a connection request from the convergence terminal 210 at step 505, the uAP 220 connects to the convergence terminal 210 by setting up a physical channel in step 510.

Upon receipt of a dialing signal from the convergence terminal 210 in step 515, the uAP 220 forwards the dialing signal to the LE 230 in step 520. Thus, a call request attempted by the convergence terminal 210 is delivered to the LE 230.

When the uAP 220 receives a ring-back tone signal in response to the dialing signal from the LE 230 in step 525, it forwards the ring-back tone signal to the convergence terminal 210 in step 527.

Upon receipt of an SMS signal between the SMSC 240 and the convergence terminal 210 in step 530, the uAP 220 sends the SMS signal in step 535.

Then the uAP 220 ends the exemplary algorithm of FIG. 5.

Figure 6:
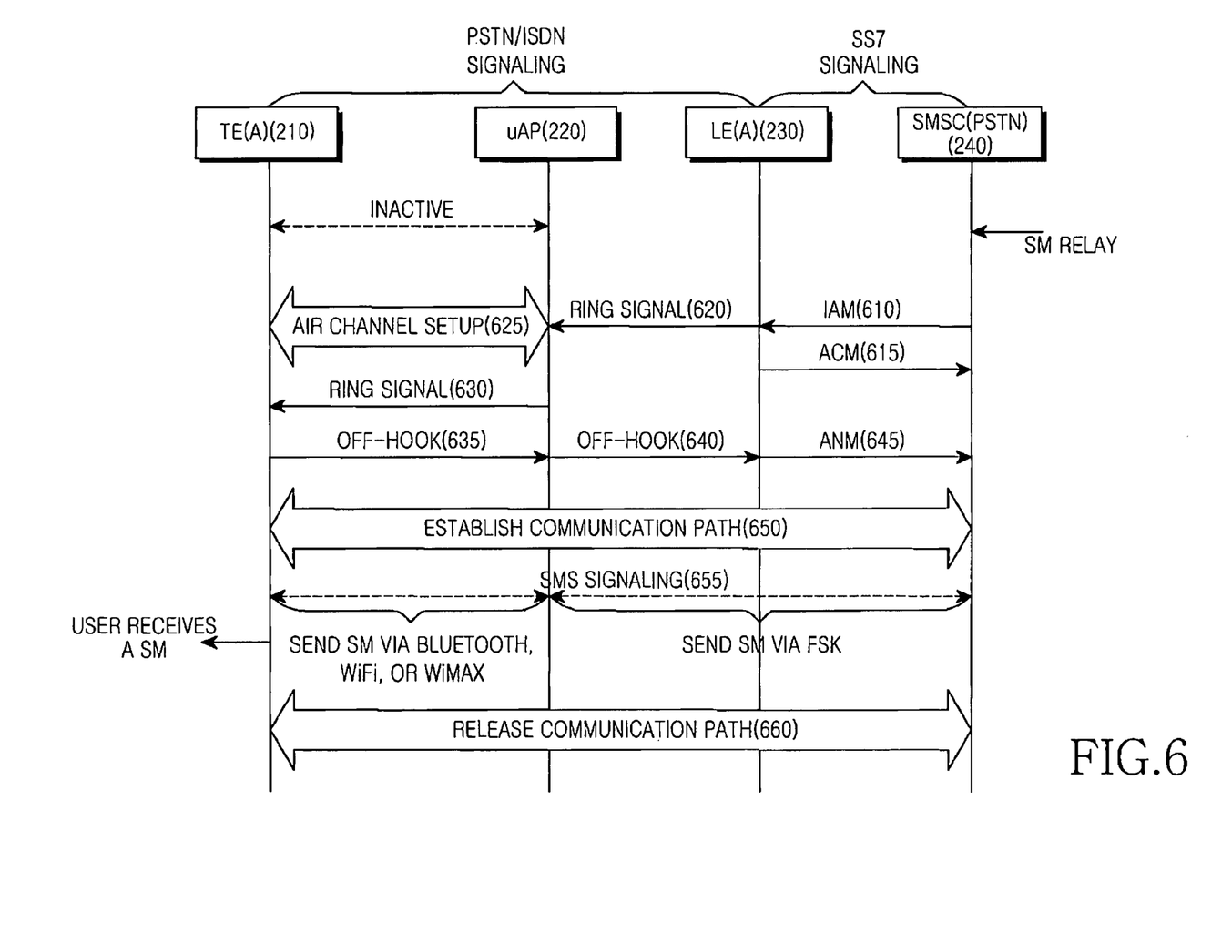
FIG. 6 is a diagram illustrating a signal flow for SMS reception according to exemplary embodiments of the present invention.

FIG. 6 is a diagram illustrating a signal flow for SMS reception according to exemplary embodiments of the present invention.

Referring to FIG. 6, the SMSC 240 receives an SM from a convergence terminal of the other party or a predetermined server.

In step 610, the SMSC 240 sends an IAM to the LE 230. The LE 230 replies to the SMSC 240 with an ACM in step 615 and sends a ring signal to the uAP 220 in step 620.

The uAP 220 is connected to the convergence terminal 210 by setting up a physical channel in step 625 and forwards the ring signal to the convergence terminal 210 in step 630.

In step 635, the convergence terminal 210 automatically generates an off-hook signal and sends it to the uAP 220. The off-hook signal is a response signal that the convergence terminal 210 sends for the ring signal.

The uAP 220 forwards the off-hook signal to the LE 230 in step 640 and the LE 230 sends an ANM to the SMSC 240 in step 645. Then, a communication path is established between the convergence terminal 210 and the SMSC 240 in step 650.

In step 655, the convergence terminal 210 and the SMSC 240 exchange SMS signals in compliance with the ETSI ES 201 912. The SMS signaling involves reception of the SM at the convergence terminal 210 from the SMSC 240.

In step 660, the convergence terminal 210 and the SMSC 240 release the communication path.

Figure 7:
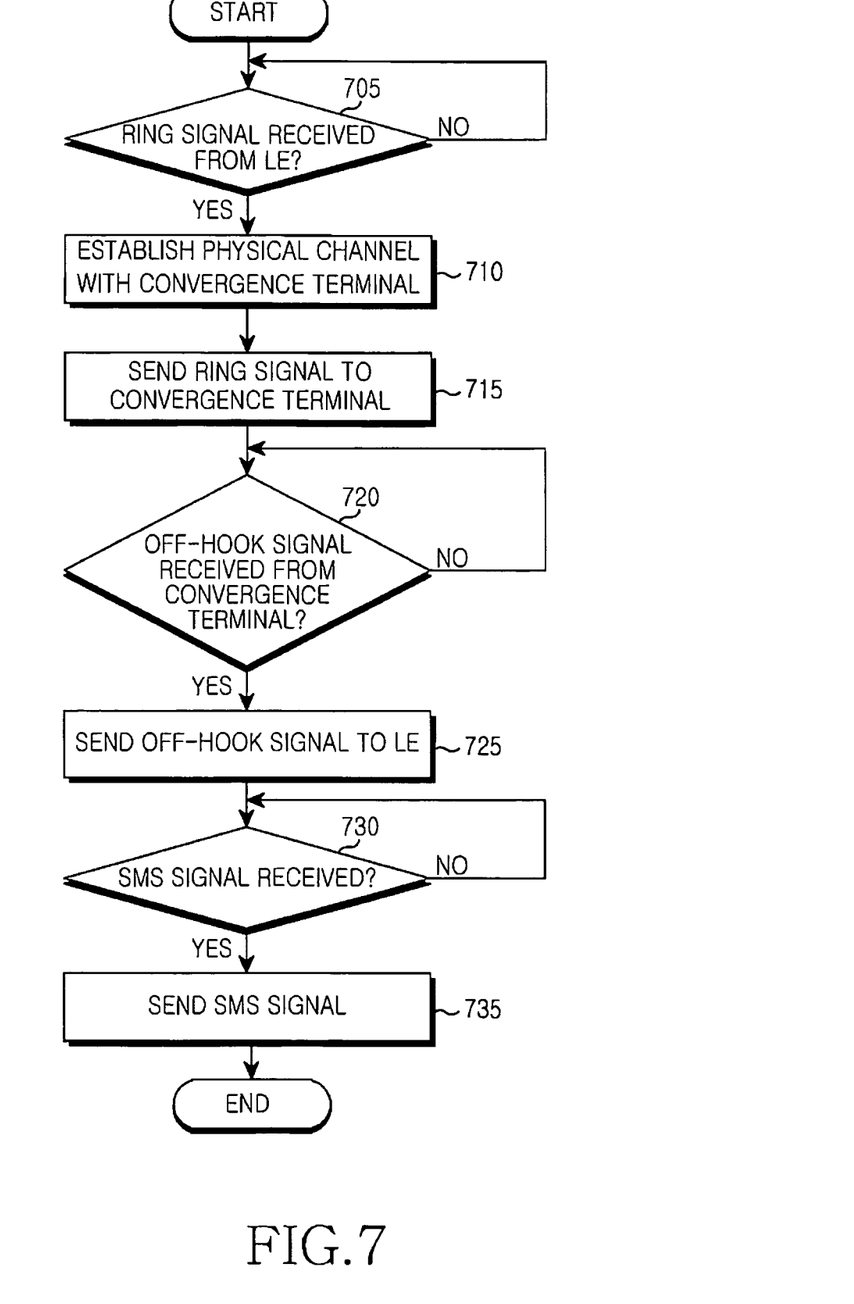
FIG. 7 is a flowchart illustrating an operation of the uAP for SMS reception according to exemplary embodiments of the present invention.

FIG. 7 is a flowchart illustrating an operation of the uAP for SMS reception according to exemplary embodiments of the present invention.

Referring to FIG. 7, upon detection of a ring signal from the LE 230 in step 705, the uAP 220 is connected to the convergence terminal 210 by establishing a physical channel in step 710 and forwards the ring signal to the convergence terminal 210 in step 715 Upon receipt of an off-hook signal from the convergence terminal 210 in step 720, the uAP 220 forwards the off-hook signal to the LE 230 in step 725.

Upon receipt of an SMS signal between the SMSC 240 and the convergence terminal 210 in step 730, the uAP 220 sends the SMS signal in step 735.

Then the uAP 220 ends the exemplary algorithm of FIG. 7.

Figure 8:
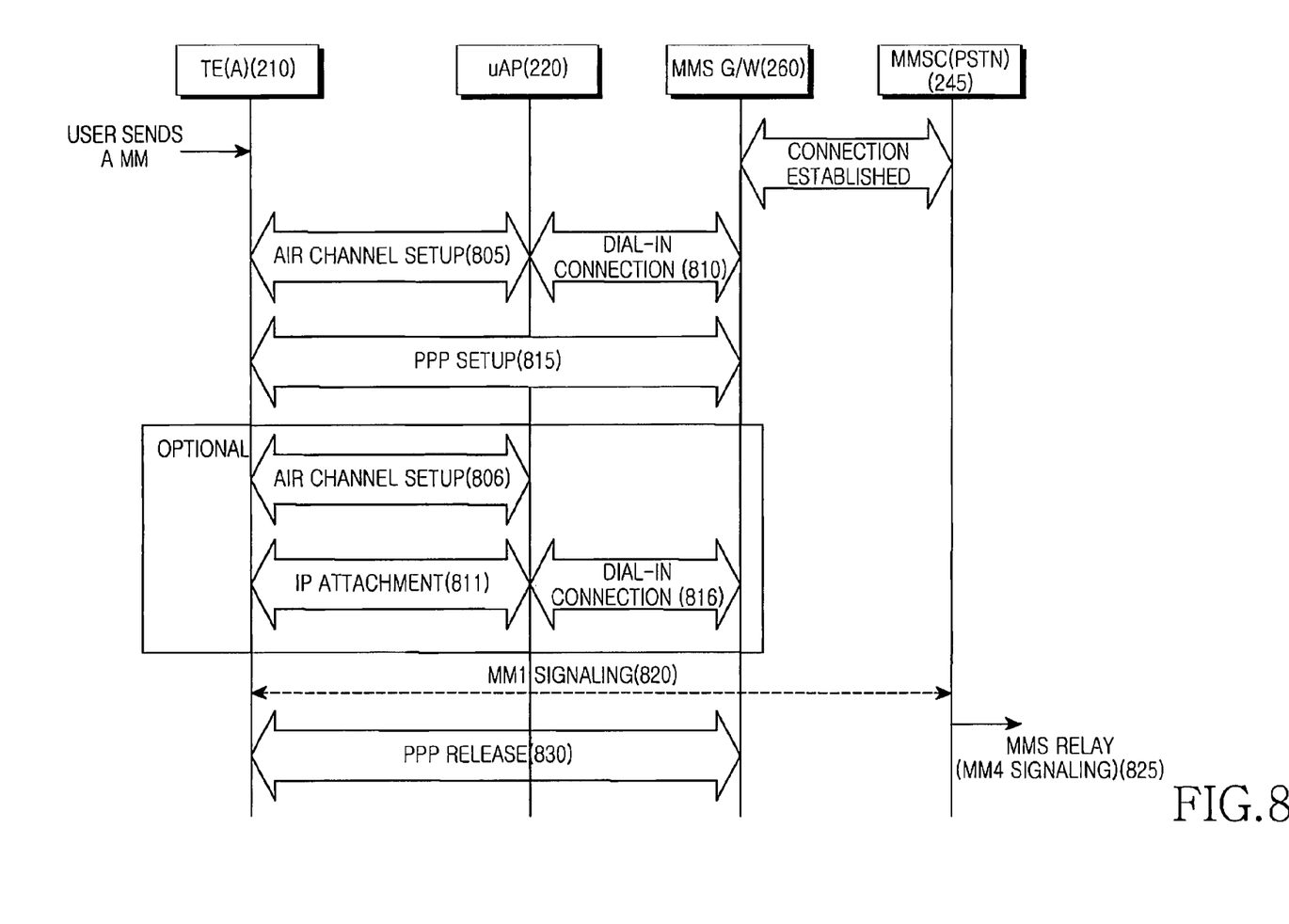
FIG. 8 is a diagram illustrating a signal flow for MMS transmission according to exemplary embodiments of the present invention.

FIG. 8 is a diagram illustrating a signal flow for MMS transmission according to exemplary embodiments of the present invention. It can be assumed herein for example, that the MMS G/W 260 has been connected to the MMSC 245.

Referring to FIG. 8, upon request of MMS transmission from the user, the convergence terminal 210 establishes a radio channel to connect to the uAP 220 in step 805.

In step 810, the uAP 220 establishes a Remote Access Service (RAS) dial-in connection with the MMS G/W 260, for Hypertext Transfer Protocol/Transport Control Protocol/Internet Protocol (HTTP/TCP/IP) communication. The RAS dial-in connection is the process of establishing a logical channel for packet communication (that is, generally not voice communication).

In step 815, the MMS G/W 260 and the convergence terminal 210 establish a PPP connection for subscriber authentication. During the PPP connection, the user is authenticated and an IP address is allocated for the HTTP/TCP/IP communication.

In yet other exemplary embodiments of the present invention, steps 805, 810 and 815 can be replaced by optional steps 806, 811 and 816.

In this case, upon receipt of MMS transmission from the user, the convergence terminal 210 establishes a radio channel with the uAP 220 in step 806 and acquires an IP address in step 811. In step 816, the uAP 220 establishes the RAS dial-in connection with the MMS G/W 260 for HTTP/TCP/IP communication.

The convergence terminal 210 then exchanges MM1 signals with the MMSC 245 in compliance with the ETSI ES 202 314 in step 820. The MM1 signaling is signaling defined between the user terminal and the MMS server. The MM1 signaling involves transmission of an MM from the convergence terminal 210 to the MMSC 245. The MMSC 245 then sends the MM to a correspondent node in step 825.

The convergence terminal 210 and the MMSC 245 release the PPP connection in step 830. In the case where steps 806, 811 and 816 are performed, step 830 is preferably not performed.

Figure 9:
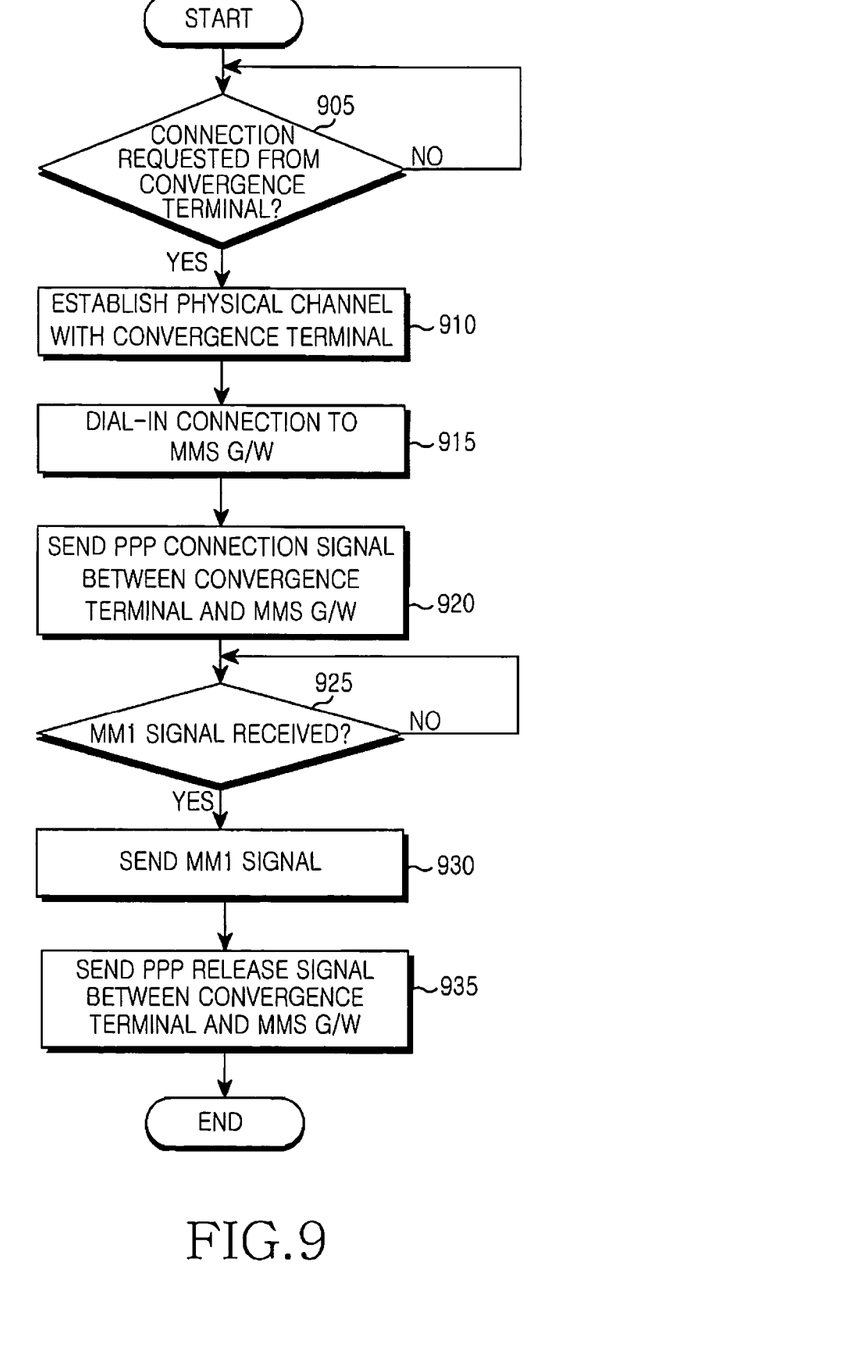
FIG. 9 is a flowchart illustrating an operation of the uAP for MMS transmission according to exemplary embodiments of the present invention.

FIG. 9 is a flowchart illustrating an operation of the uAP for MMS transmission according to exemplary embodiments of the present invention.

Referring to FIG. 9, upon receipt of a connection request from the convergence terminal 210 in step 905, the uAP 220 is connected to the convergence terminal by establishing a physical channel in step 910.

In step 915, the uAP 220 establishes a RAS dial-in connection with the MMS G/W 260 for HTTP/TCP/IP communication. The RAS dial-in connection is the process of establishing a logical channel for packet communication (that is, generally not voice communication).

In step 920, the uAP 220 sends a PPP connection signal between the convergence terminal 210 and the LE 230.

While not shown, in yet other exemplary embodiments of the present invention, the uAP 220 can allocate an IP address to the convergence terminal 210 and establish the RAS dial-in connection with the MMS G/W 260 for HTTP/TCP/IP communication, in place of steps 915 and 920.

Upon receipt of an MM1 signal between the convergence terminal 210 and the MMSC 245 in step 925, the uAP 220 forwards the MM1 signal in step 930.

In step 935, the uAP 220 sends a PPP release signal between the convergence terminal 210 and the MMSC 245. If the PPP connection is not established in step 920, there is preferably no need for step 935.

The uAP 220 then ends the exemplary algorithm of FIG. 9.

Figure 10:
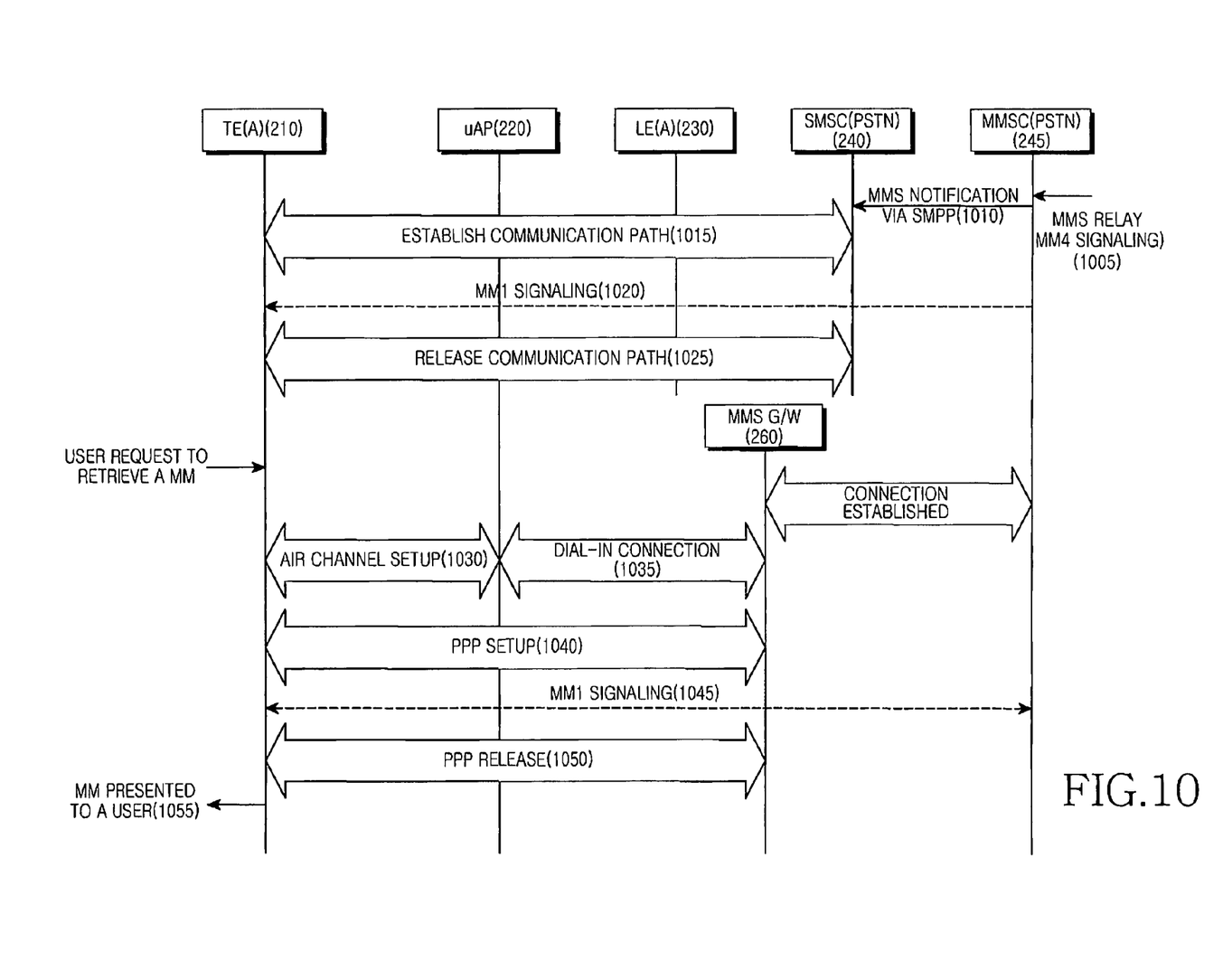
FIG. 10 is a diagram illustrating a signal flow for MMS reception according to exemplary embodiments of the present invention.

FIG. 10 is a diagram illustrating a signal flow for MMS reception according to exemplary embodiments of the present invention. It can be assumed herein for example, that the MMS G/W 260 has been connected to the MMSC 245.

Referring to FIG. 10, the MMSC 245 receives an MM from a correspondent node or a predetermined server by MM4 signaling in compliance with the ETSI ES 202 314 in step 1005.

In step 1010, the MMSC 245 sends an MMS notification message to the SMSC 240 by a Short Message Peer to Peer (SMPP) protocol.

The SMSC 240 establishes a communication path with the convergence terminal 210 and sends an SM to the convergence terminal 210 in order to provide notification of the reception of the MM in step 1015. The communication path setup is carried out in substantially the same manner as in steps 610 to 650 of FIG. 6.

The MMSC 245 sends an MM1 signal to the convergence terminal 210 in step 1020. The MM1 signal is an MM1-notification.REQ message defined by the ETSI ES 202 314. The MM1-notification.REQ message indicates the location of the MM and that the MM is ready for transmission to the convergence terminal 210.

The convergence terminal 210 and the SMSC 240 then release the communication path in step 1025.

If the user is alerted of the incoming MM and requests reception of the MM, the convergence terminal 210 is connected to the uAP 220 by establishing a physical channel in step 1030.

The uAP 220 establishes an RAS dial-in connection with the MMS G/W 260 for HTTP/TCP/IP communication in step 1035.

The MMS G/W 260 and the convergence terminal 210 establish a PPP connection for subscriber authentication in step 1040. During the PPP connection, the user is authenticated and an IP address is allocated for the HTTP/TCP/IP communication.

The convergence terminal 210 then exchanges MM1 signals with the MMSC 245 in compliance with the ETSI ES 202 314 in step 1045. The MMI signaling involves reception of the MM at the convergence terminal 210 from the MMSC 245.

During the MM1 signaling, the convergence terminal 210 sends an MM1_notification.RES message for the MM1_notificaiton.REQ message received in step 1020 to the MMSC 245. The convergence terminal 210 then sends an MM1_retrieve.REQ message to the MMSC 245, and the MMSC 245 replies with an MM1_retrieve.RES message. The MM1_retrieve.REQ message requests transmission of the MM and the MM1_retrieve.RES message contains the MM. The convergence terminal 210 then sends an MM1_acknwledgement.REQ message to the MMSC 245. The MM1_acknwledgement.REQ message requests the MMSC 245 to notify the correspondent node or the predetermined server that sent the MM whether the convergence terminal 210 has received the MM.

In step 1050, the convergence terminal 210 and the MMS G/W 260 release the PPP connection. The convergence terminal 210 then presents the MM to a user at step 1055.

Figure 11:
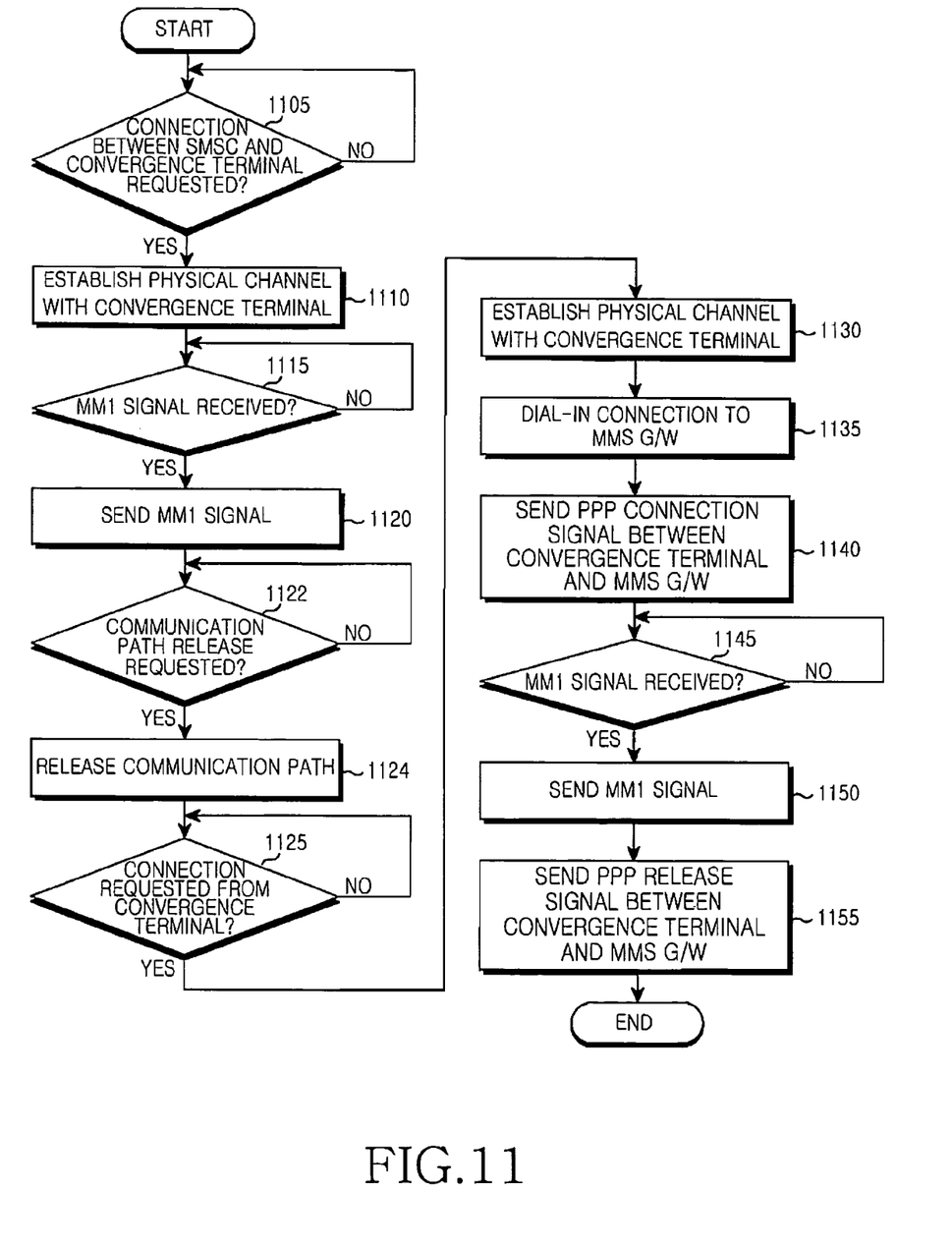
FIG. 11 is a flowchart illustrating an operation of the uAP for MMS reception according to exemplary embodiments of the present invention.

FIG. 11 is a flowchart illustrating an operation of the uAP for MMS reception according to exemplary embodiments of the present invention.

Referring to FIG. 11, when the uAP 220 receives a request for establishing a communication path between the convergence terminal 210 and the SMSC 240 from the SMSC 240 in step 1105, it establishes a physical channel with the convergence terminal 210 in step 1110.

Upon receipt of an MM1 signal from the SMSC 240 in step 1115, the uAP 220 forwards the MM1 signal to the convergence terminal 210 in step 1120. The MM1 signal indicates that the SMSC 240 has received an MM destined for the convergence terminal 210.

If a request for releasing the communication path is received in step 1122, the uAP 220 releases it in step 1124.

The user is alerted of the incoming MM and requests reception of the MM. Upon receipt of a connection request from the convergence terminal 210 in step 1125, the uAP 220 establishes a physical channel with the convergence terminal 210 in step 1130.

The uAP 220 establishes an RAS dial-in connection with the MMS G/W 260 for HTTP/TCP/IP communication in step 1135, and sends a PPP connection signal between the convergence terminal 210 and the MMS G/W 260 in step 1140.

Upon receipt of an MM1 signal between the convergence terminal 210 and the MMS G/W 260 in step 1145, the uAP 220 forwards the MM1 signal in step 1150. During the MM1 signaling, the convergence terminal 210 receives the MM.

In step 1155, the uAP 220 sends a PPP release signal between the convergence terminal 210 and the MMS G/W 260. The uAP 20 then ends the exemplary algorithm of FIG. 11.

As described above, embodiments of the present invention enable a convergence terminal to receive SMS and MMS by a wireless communication technology other than a mobile communication technology, even though it is located in a mobile communication shadowing area. Also, the utilization of the PSTN, which is currently on the decrease due to the development of mobile communication technology, is increased.

While the invention has been shown and described with reference to certain exemplary embodiments thereof, it will be understood by those skilled in the art that various changes in form and detail may be made therein without departing from the spirit and scope of the invention as defined by the appended claims and equivalents.

What is claimed is:

1. An Access Point (AP) for providing a Short Message Service (SMS) and a Multimedia Messaging Service (MMS) in a wired telephone network, comprising:
   an access module for providing a wireless connection interface for wireless communication with a convergence terminal;
   a control module for controlling wireless communication and communications with the wired telephone network to provide at least one of the SMS and the MMS to the convergence terminal via the access module;
   a wired phone module connected to the access module and the wired telephone network, for exchanging signals of a wireless communication network with the wired telephone network under the control of the control module;

a SMS modem connected to the access module and the wired telephone network, for processing transmission and reception of a short message under the control of the control module; and a MMS modem connected to the access module and the wired telephone network, for processing transmission and reception of a multimedia message under the control of the control module, wherein the wired telephone network comprises a Public Switched Telephone Network (PSTN), wherein the MMS modem establishes a dial-in connection with a MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

2. The AP of claim 1, wherein the wired telephone module comprises:

a ring detector for detecting a ring signal from the wired telephone network;

a Dual Tone Multiple Frequency (DTMF) generator for generating a DTMF signal; and an analog-to-digital converter for exchanging signals between a wired telephone interface and the access module.

3. A method of sending a short message from a convergence terminal over a wired telephone network, comprising:

wirelessly connecting an Access Point (AP) and a convergence terminal, for transmission of a short message, wherein the AP comprises a Short Message Service (SMS) modem and a Multimedia Messaging Service (MMS) modem;

controlling the SMS modem of the AP, for processing transmission and reception of the short message and relaying information between the convergence terminal and an SMS Center (SMSC) to establish a communication path between the convergence terminal and the SMSC;

sending the short message to the SMSC by relaying SMS signaling information between the convergence terminal and the SMSC; and relaying information between the convergence terminal and the SMSC, for releasing the communication path, wherein the SMS modem is connected to a wired telephone network for processing transmission and reception of a short message, wherein the MMS modem is connected to the wired telephone network for processing transmission and reception of a multimedia message, wherein the wired telephone network comprises a Public Switched Telephone Network (PSTN), wherein the MMS modem establishes a dial-in connection with a MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

4. The method of claim 3, wherein the relaying of information to establish a communication path comprises:

receiving a dialing signal from the convergence terminal;

sending the dialing signal to a local exchange;

receiving a ring-back tone signal from the local exchange;

sending the ring-back tone signal to the convergence terminal; and receiving a response signal for the ring-back tone signal from the convergence terminal.

5. A method of sending a short message from a wired telephone network to a convergence terminal, comprising:

sending, upon receipt of a ring signal, the ring signal to a convergence terminal;

monitoring receipt of a response signal for the ring signal at an Access Point (AP) from the convergence terminal, wherein the AP comprises a Short Message Service (SMS) modem and a Multimedia Messaging Service (MMS) modem;

controlling the SMS modem of the AP, for processing transmission and reception of a short message and relaying information for establishing a communication path between the convergence terminal and an SMS Center (SMSC), upon receipt of the response signal;

controlling the SMS modem of the AP, for sending the short message to the convergence terminal by relaying SMS signaling information between the convergence terminal and the SMSC; and relaying information for releasing the communication path between the convergence terminal and the SMSC, wherein the SMS modem is connected to a wired telephone network for processing transmission and reception of a short message, wherein the MMS modem is connected to the wired telephone network for processing transmission and reception of a multimedia message, wherein the wired telephone network comprises a Public Switched Telephone Network (PSTN), wherein the MMS modem establishes a dial-in connection a the MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

6. The method of claim 5, wherein the sending of the ring signal comprises:

wirelessly connecting an Access Point (AP) and the convergence terminal; and sending the ring signal to the convergence terminal.

7. The method of claim 5, wherein the monitoring of the receipt of a response signal for the ring signal comprises:

monitoring receipt of an off-hook signal from the convergence terminal; and sending, upon receipt of the off-hook signal, the off-hook signal to a local exchange.

8. A method of sending a multimedia message from a convergence terminal over a wired telephone network, comprising:

wirelessly connecting an Access Point (AP) and a convergence terminal, wherein the AP comprises a Short Message Service (SMS) modem and a Multimedia Messaging Service (MMS) modem;

controlling the MMS modem of the AP, for processing transmission and reception of a multimedia message and establishing a dial-in connection with an MMS gateway, wherein the MMS modem is configured to be connected to the MMS gateway over a Public Switched Telephone Network (PSTN);

relaying information for a Point-to-Point Protocol (PPP) connection between the convergence terminal and the MMS gateway; and controlling the MMS modem of the AP, for sending the multimedia message to an MMS Center (MMSC) by relaying signaling information between the convergence terminal and the MMSC, wherein the SMS modem is connected to a wired telephone network for processing transmission and reception of a short message, wherein the MMS modem is connected to the wired telephone network for processing transmission and reception of a multimedia message, wherein the wired telephone network comprises the PSTN, wherein the MMS modem establishes a dial-in connection with the MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

9. The method of claim 8, further comprising relaying PPP information for releasing the PPP connection, after sending the multimedia message.

10. The method of claim 8, further comprising:
allocating an Internet Protocol (IP) address to the convergence terminal, after the dial-in connection; and
sending the multimedia message to the MMSC by relaying signaling information between the convergence terminal and the MMSC.

11. The method of claim 10, further comprising releasing the IP address, after sending the multimedia message.

12. A method of sending a multimedia message from a wired telephone network to a convergence terminal, comprising:

relaying information indicating an incoming multimedia message to a convergence terminal;

controlling an MMS modem of an Access Point (AP), for processing transmission and reception of a multimedia message and relaying information for establishing a communication path between the convergence terminal and a Multimedia Messaging Service (MMS) gateway, wherein the AP comprises a Short Message Service (SMS) modem and the MMS modem;

wirelessly connecting the AP and the convergence terminal, for reception of the multimedia message, wherein the MMS modem is configured to be connected to the MMS gateway over a Public Switched Telephone Network (PSTN);

establishing a dial-in connection with the MMS gateway;

relaying information for a Point-to-Point Protocol (PPP) connection between the convergence terminal and the MMS gateway; and controlling the MMS modem of the AP, for relaying signaling information between the convergence terminal and an MMS Center (MMSC) to send the multimedia message, wherein the SMS modem is connected to a wired telephone network for processing transmission and reception of a short message, wherein the MMS modem is connected to the wired telephone network for processing transmission and reception of a multimedia message, wherein the wired telephone network comprises the PSTN, wherein the MMS modem establishes a dial-in connection with the MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

13. The method of claim 12, further comprising relaying PPP information for releasing the PPP connection, after relaying the signaling information.

14. The method of claim 12, wherein the relaying of the information indicating an incoming multimedia message to the convergence terminal comprises:

relaying information for establishing a communication path between the convergence terminal and a Short Message Service (SMS) Center (SMSC);

relaying signaling information indicating the incoming multimedia message to the convergence terminal; and relaying information for releasing the communication path between the convergence terminal and the SMSC.

15. A system for sending and receiving a short message to and from a convergence terminal over a wired telephone network, comprising:

a convergence terminal for sending and receiving short messages by a wireless communication protocol;

an Access Point (AP) for controlling Short Message Service (SMS) modem for processing transmission and reception of the short message and communicating with the convergence terminal by the wireless communication protocol and relaying incoming and outgoing short messages of the convergence terminal to an SMS Center (SMSC) via a Public Switched Telephone Network (PSTN), wherein the AP comprises the SMS modem and a MMS modem; and an SMSC for receiving an outgoing short message from the convergence terminal via the AP and the PSTN, and sending an incoming short message received from a correspondent node to the convergence terminal via the AP and the PSTN, wherein the SMS modem is connected to a wired telephone network for processing transmission and reception of a short message, wherein the MMS modem is connected to the wired telephone network for processing transmission and reception of a multimedia message, wherein the wired telephone network comprises the PSTN, wherein the MMS modem establishes a dial-in connection with a MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

16. The system of claim 15, wherein the AP is configured to be connected to the SMSC over the Public Switched Telephone Network (PSTN) and relay information between the convergence terminal and the SMSC.

17. A system for sending and receiving a multimedia message to and from a convergence terminal over a wired telephone network, comprising:
- a convergence terminal for sending and receiving multimedia messages by a wireless communication protocol;
- an Access Point (AP) for communicating with the convergence terminal by the wireless communication protocol and relaying incoming and outgoing multimedia messages of the convergence terminal, comprising a Short Message Service (SMS) modem for processing transmission and reception of a short message and a MMS modem for processing transmission and reception of a multimedia message;
- a Multimedia Messaging Service (MMS) gateway for connecting to the convergence terminal via the AP, providing notification of arrival of an incoming multimedia message for the convergence terminal, and relaying the incoming and outgoing multimedia messages via the AP;
- an SMS Center (SMSC) for receiving the incoming multimedia message for the convergence terminal and notifying the MMS gateway of the incoming multimedia message; and
- a MMS Center (MMSC) for receiving an outgoing multimedia message from the convergence terminal and sending the outgoing multimedia message to a correspondent node, and receiving an incoming multimedia message from the correspondent node and sending the outgoing multimedia message to the convergence terminal, wherein the SMS modem is connected to a wired telephone network for processing transmission and reception of the short message, wherein the MMS modem is connected to the wired telephone network for processing transmission and reception of the multimedia message, wherein the wired telephone network comprises a Public Switched Telephone Network (PSTN), wherein the MMS modem establishes a dial-in connection with the MMS gateway, and wherein the establishing the dial-in connection with the MMS gateway comprises receiving a dialing signal from the convergence terminal, sending the dialing signal to a local exchange, receiving a ring-back tone signal from the local exchange, sending the ring-back tone signal to the convergence terminal, and receiving a response signal for the ring-back tone signal from the convergence terminal.

18. The system of claim 17, wherein the AP is configured to be connected to the MMS gateway over the PSTN and relay information between the convergence terminal and the MMSC.

19. The system of claim 17, wherein the AP is configured to be connected to the MMS gateway over the PSTN and relay information between the convergence terminal and the SMSC.

* * * * *